United States Patent
Witt et al.

(10) Patent No.: US 6,624,396 B2
(45) Date of Patent: Sep. 23, 2003

(54) CONVEYOR SPEED CONTROL SYSTEM FOR A CONVEYOR OVEN

(75) Inventors: Allan E. Witt, Brown Deer, WI (US); Mark E. Gilpatric, Milwaukee, WI (US)

(73) Assignee: Hatco Corporation, Milwaukee, WI (US)

(*) Notice: Subject to any disclaimer, the term of this patent is extended or adjusted under 35 U.S.C. 154(b) by 76 days.

(21) Appl. No.: 09/941,197

(22) Filed: Aug. 28, 2001

(65) Prior Publication Data

US 2003/0042248 A1 Mar. 6, 2003

(51) Int. Cl.$^7$ ................................. H05B 1/02
(52) U.S. Cl. ................. 219/497; 219/388; 219/501; 99/328; 99/332
(58) Field of Search ................. 219/506, 497, 219/494, 388, 501; 99/325–337

(56) References Cited

U.S. PATENT DOCUMENTS

| | | | |
|---|---|---|---|
| 4,246,834 A | * 1/1981 | Brown | 99/334 |
| 4,554,437 A | * 11/1985 | Wagner | 219/388 |
| 5,253,564 A | 10/1993 | Rosenbrock et al. | |
| 6,168,064 B1 | * 1/2001 | Berskin | 228/9 |

OTHER PUBLICATIONS

PCT International Search Report, (Form PCT/ISA/210 (first sheet), (second sheet), (patent family annex)), dated Oct. 29, 2002, 3 pages.

* cited by examiner

*Primary Examiner*—Mark Paschall
(74) *Attorney, Agent, or Firm*—Foley & Lardner

(57) ABSTRACT

A control system is disclosed for controlling the speed at which an electric motor drives a conveyor to move products through a conveyor oven. The system includes a temperature sensor configured to sense the temperature of the conveyor oven and a speed adjustment input for selecting a speed setting corresponding to a desired amount of heat to be transferred to the products that move through the conveyor oven. The system also includes a controller having temperature data storage capacity and programmable logic capability. The controller receives input signals from the temperature sensor and the speed adjustment input to perform operations on the stored temperature data and the input signals to provide an output signal to control the speed of the motor according to changes in the temperature of the conveyor oven

20 Claims, 3 Drawing Sheets

CONVEYOR SPEED CONTROL SYSTEM FOR A CONVEYOR OVEN

FIELD OF THE INVENTION

The present invention relates generally to the field of conveyor ovens and more particularly to conveyor ovens which include a control system for controlling the speed at which a conveyor moves food products through the oven.

BACKGROUND OF THE INVENTION

Conveyor ovens typically include an oven housing, a heat source within the housing, and a conveyor configured to move food products through the oven, whereby the food products are heated or toasted by the heat source. The use of an endless conveyor to move food products through the oven typically increases the processing capacity of conveyor ovens over other types of ovens. The degree to which food products are heated depends on the temperature within the conveyor oven and the time period during which food products are heated (which is a function of conveyor speed). Thus, to control the degree of heating, conveyor ovens typically provide operator controls configured to adjust the oven temperature or conveyor speed.

Different types of conveyor ovens are known. For example, conveyor toasters are commonly used to toast food products including bread, buns, bagels, muffins and waffles. A full line of electric conveyor toasters is made, for example, by Hatco Corporation of Wisconsin. These conveyor toasters, which include both vertical and horizontal models, include a toaster housing, electric heating elements mounted within the toaster housing, and an endless conveyor which moves food products adjacent to the heating elements such that the food products are toasted. The food products can be placed directly on the conveyor of a horizontal toaster oven, or can be held within a food-carrying basket of either a vertical or horizontal toaster oven. Food products are manually loaded through an opening in the housing, are toasted as they are moved past the heating elements by the endless conveyor, and are discharged into a product receiving tray located at the bottom of the housing.

Other types of conveyor ovens for processing food products include, for example, conveyorized pizza ovens, microwave ovens and tunnel ovens. However, conveyor ovens may also be used to heat products other than food. For example, conveyor ovens may be used to cure rubber sheets or to dry ink on printed materials. Control over the degree of heating in each type of conveyor oven is typically accomplished by varying the oven temperature or the conveyor speed. Although the description below is focused on toaster conveyor ovens, the term "conveyor oven" is intended to include other conveyor oven types.

In some conveyor ovens using analog conveyor speed control systems, conveyor speed is controlled by an operator using a variable-resistance device (e.g., a rheostat) in parallel with a diode. The rheostat-diode forms part of a speed control circuit which controls the speed of an AC electric motor driving the conveyor via gears. The degree of toasting is set by appropriate adjustment of the rheostat. An increase in resistance causes the speed control circuit to decrease the conveyor speed, thereby increasing the degree of toasting. Conversely, a decrease in resistance of the rheostat causes an increase in conveyor speed, thereby decreasing the degree of toasting. The operator adjusts the rheostat setting such that the food product being processed is properly heated or toasted. An example of a toaster conveyor oven having such a speed control circuit is the TK-105E oven made by Hatco Corp.

The temperature at which food products processed by certain conveyor ovens are heated depends on the status of the oven's electric heating elements. For example, in the TK-105E oven made by Hatco Corp., one set of elements is always powered while a second set is switched on and off by a temperature-controlled switch (e.g., thermostat). The second set of elements is switched off when the oven temperature exceeds the threshold temperature setting of the thermostat, and is switched on when the temperature drops below the threshold. Thus, the oven temperature is regulated about the threshold setting of the thermostat. The thermostat does not affect the speed of the conveyor.

Despite having control circuits for controlling the conveyor speed and heating elements, such conveyor ovens are unable to control the degree to which food products are heated under certain conditions. For example, assume a speed control circuit is adjusted to properly toast a given load of food products. Then, assume a higher load of food products is introduced. The load increase will cause a drop in temperature, and the thermostat may cause additional heating elements to switch on. After a time, the additional elements will provide additional heat to compensate for the higher load. However, the additional elements may need a significant time period to heat up. For example, metal-sheathed electric heating elements commonly used in such ovens require 3–4 minutes to reach their operating temperatures. During this period, food products being processed will receive an insufficient amount of heat energy and will be undercooked.

Attempted solutions to this problem have been to increase the power of the additional heating elements or to switch on more heating elements using the thermostat. These solutions, however, have several drawbacks. First, the higher power ratings or additional heating elements increases the cost of the ovens. Second, the additional power can result in over-heating or burning the products. Third, the power requirements of the conveyor ovens are increased, thereby increasing operating costs.

Accordingly, it would be advantageous to provide an improved speed control system for a conveyor oven for accommodating loading-induced oven temperature changes. It would also be advantageous to accommodate loading-induced temperature changes without requiring additional heating elements that use excess power, may overheat food or other products, and adversely affect temperature-sensitive oven control components. It would also be advantageous to provide a conveyor speed control system which senses oven temperature and responds to a decrease in steady state oven temperature by slowing the conveyor without manual input to increase the heating time of the food products being processed. It would be further advantageous to provide a simplified conveyor speed control system having decreased complexity, lower costs and increased reliability. Accordingly, it would be advantageous to provide an improved speed control system for a conveyor oven having any one or more of these features.

SUMMARY OF THE INVENTION

The invention relates to a control system for controlling the speed at which an electric motor drives a conveyor to move products through a conveyor oven. The system includes a temperature sensor configured to sense the temperature of the conveyor oven at a product heating region near the conveyor and a speed adjustment input for selecting a speed setting corresponding to a desired amount of heat to be transferred to the products that move through the conveyor oven. The system also includes a controller having temperature data storage capacity and programmable logic capability. The controller receives an input signal from the temperature sensor and an input signal from the speed adjustment input and in some cases from a motor speed sensor to perform operations on the stored temperature data and the input signals to provide an output signal to control the speed of the motor according to changes in the temperature of the conveyor oven.

The invention also relates to a conveyor oven having an oven housing, a plurality of heating elements mounted within the oven housing and a conveyor configured to move products through the oven housing adjacent the heating elements such that the products are exposed to the heating elements. An AC electric motor is mechanically coupled to the conveyor to move the conveyor at different speeds in response to the temperature within the oven housing and a speed adjustment input device provides an initial speed setting to the motor.

A temperature-sensing device generates a temperature signal based upon the temperature within the oven housing. A controller is coupled to the speed adjustment input device, the motor, and the temperature-sensing device, and operates to decrease the speed of the conveyor when the sensed temperature drops below a steady state oven temperature and increase the speed of the conveyor when the sensed temperature approaches the steady state oven temperature.

The invention further relates to a method of controlling the speed at which an electric motor drives a conveyor to move products through a conveyor oven and includes the steps of setting an operator-adjustable input to a controller that provides an output signal to drive the motor at a desired speed for a given load of products, sensing a temperature within the conveyor oven, determining when a change in load of products has occurred based on a change in the sensed temperature, and compensating for the change in load by changing the output signal of the controller to the motor, effectively changing the setting of the operator-adjustable input, whereby the speed of the conveyor is changed to compensate for the change in load.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF PREFERRED AND EXEMPLARY EMBODIMENTS

Figure 1:
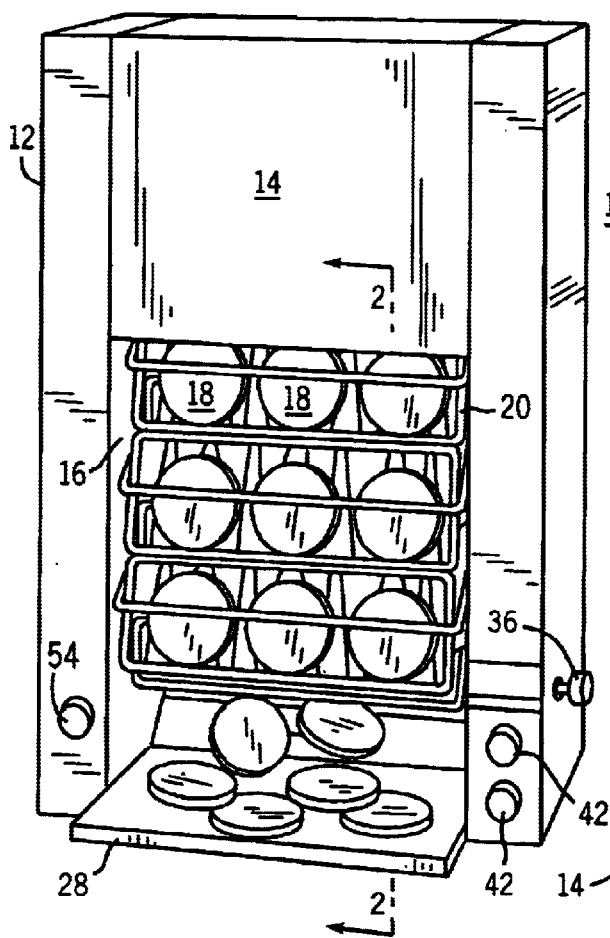
FIG. 1 is a perspective view of a conveyor oven including an oven housing and a conveyor that moves baskets adjacent to heating elements mounted within the oven housing, according to an exemplary embodiment of the present invention.
Figure 2:
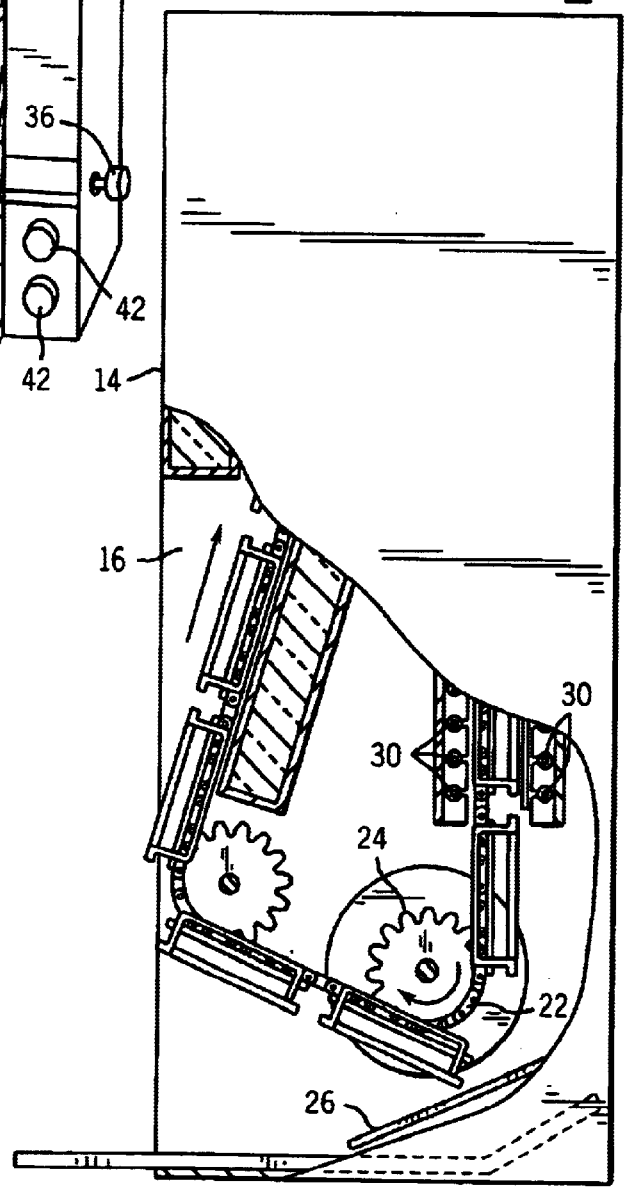
FIG. 2 is a side view of the oven shown in FIG. 1 according to an exemplary embodiment of the present invention.

Referring to FIGS. 1 and 2, an exemplary toaster conveyor oven 10 includes an oven housing 12 having an insulated front wall 14 with an aperture 16 through which food products 18 are inserted into food-carrying baskets 20. The top, sides and back of housing 12 are insulated. Baskets 20 are coupled to a pair of continuous chains 22 which move the baskets into a toasting zone within oven 10. Chains 22 are supported by rotatable sprockets 24 driven by a shaded pole AC electric gear-type motor via a drive shaft (not shown). A clutch and gear assembly (not shown) may be provided between the motor and sprockets 24 to drive the conveyor in the clockwise direction as shown in FIG. 2. Baskets 20 include an open-wire framework configured to retain the products in place while being moved through oven 10.

In operation, food products 18 may be inserted through aperture 16 for retention within baskets 20. Baskets 20 are moved by the conveyor through toasting zone of oven 10. Products reaching the bottom of the conveyor fall from baskets 20 onto a slanted wall 26, where they are guided into a receiving tray 28 for removal.

Figure 4:
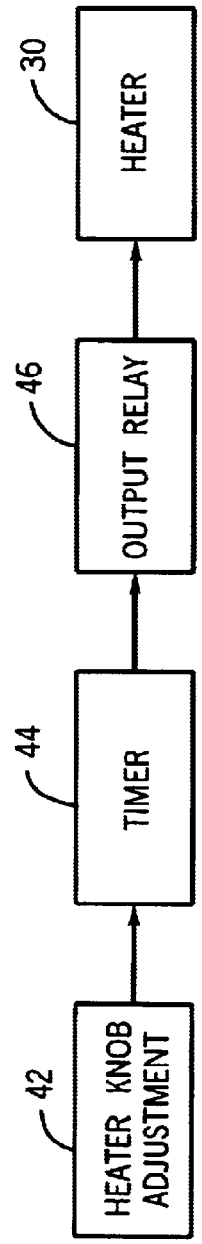
FIG. 4 is a block diagram of a heater element control for a conveyor oven according to an exemplary embodiment of the present invention.

Electric heating elements 30 are mounted within housing 12 adjacent to chains 22 such that food products 18 retained within baskets 20 are exposed to heat (such as convective or radiant) emitted by elements 30. The configuration of elements 30 depends on the application, however elements 30 are preferably configured into two banks, one on either side of the conveyor, to provide heating to both sides of food product 18 as it travels through oven 10. Elements 30 may be metal-sheathed electric heating elements, although other types of heating elements (e,g. quartz tube heaters) may be used. Elements 30 typically require a significant time period to reach their operating temperatures after turn on. The operation of elements 30 may be controlled by a heater control system 40 as shown in FIG. 4 including a manually selectable heater input adjustment 42 (such as a knob interfacing with a timer 44) that provides an energize time demand in the range of zero (0) to one hundred (100) percent for energizing elements 30 for a portion of the timer 44 duty cycle. Heater adjustment input 42 preferably interfaces with a potentiometer that provides an adjustable signal to a microprocessor, which provides a corresponding output signal to timer 44 in a linear relationship over the full adjustment range. In a particularly preferred embodiment, heater adjustment input 42 may be positioned such that full rotation in one direction provide, a zero (0) percent energize time demand to timer 44 and full rotation of the heater adjustment input 42 in the opposite direction provides a one hundred (100) percent energize time demand to timer 44. Timer 44 may interface directly with an output relay 46 for switching electrical power on and off to elements 30. In a particularly preferred embodiment, timer 44 and relay 46 control the supply of electric power to elements 30 on a five (5) second duty cycle such that elements 30 are energized for the energize time demand selected by the position of heater adjustment input 42 and then de-energized for the remaining portion of the five (5) second duty cycle. For example, if heater adjustment input 42 is set at a level corresponding to fifty (50) percent, then timer 44 and relay 46 will alternately energize elements 30 for 2.5 seconds and de-energize elements 30 for 2.5 seconds in a continuing cycle. If heater adjustment input 42 is set at a level corresponding to sixty (60) percent, then timer 44 end relay 46 will alternately energize elements 30 for three (3) seconds and de-energize elements 30 for two (2) seconds in a continuous cycle. As the setting of heater adjustment input 42 is increased, the amount of time that elements 30 are energized increases in a corresponding linear manner to increase the intensity of heat provided at the elements for heating food products 18.

In a particularly preferred embodiment, two sets of heater controls may be provided, one for each bank of elements, so that each bank of elements 30 may be independently controlled to provide greater flexibility for heating a wide variety of food products. For example, if food product 18 is a bun, the bank of elements 30 elements facing the cut-side of the bun may be operated at a higher energize time demand and correspondingly greater heat intensity, while the bank of elements facing the uncut side of the bun may be operated at a lower energize time demand and a correspondingly lesser heat intensity. In alternative embodiments, timers with duty cycles having time periods other than five (5) seconds may be selected or programmed for use depending on the characteristics of the product to be heated and customized for optimum performance with the type of heater elements being used.

The extent to which food products 18 are heated or toasted by oven 10 depends upon the speed of the conveyor, and upon which elements 30 are turned on and their power level settings. The user can adjust conveyor speed using a speed adjustment input shown as knob 54. The on/off and power rating configuration of elements 30 are selected for a particular oven. In some ovens, different configurations are selected by the user depending on the type of food or other products 18 being heated. The conveyor speed is controlled as described below. Oven 10 may also be equipped with a manual advance knob 36 to manually advance the conveyor.

Figure 5:
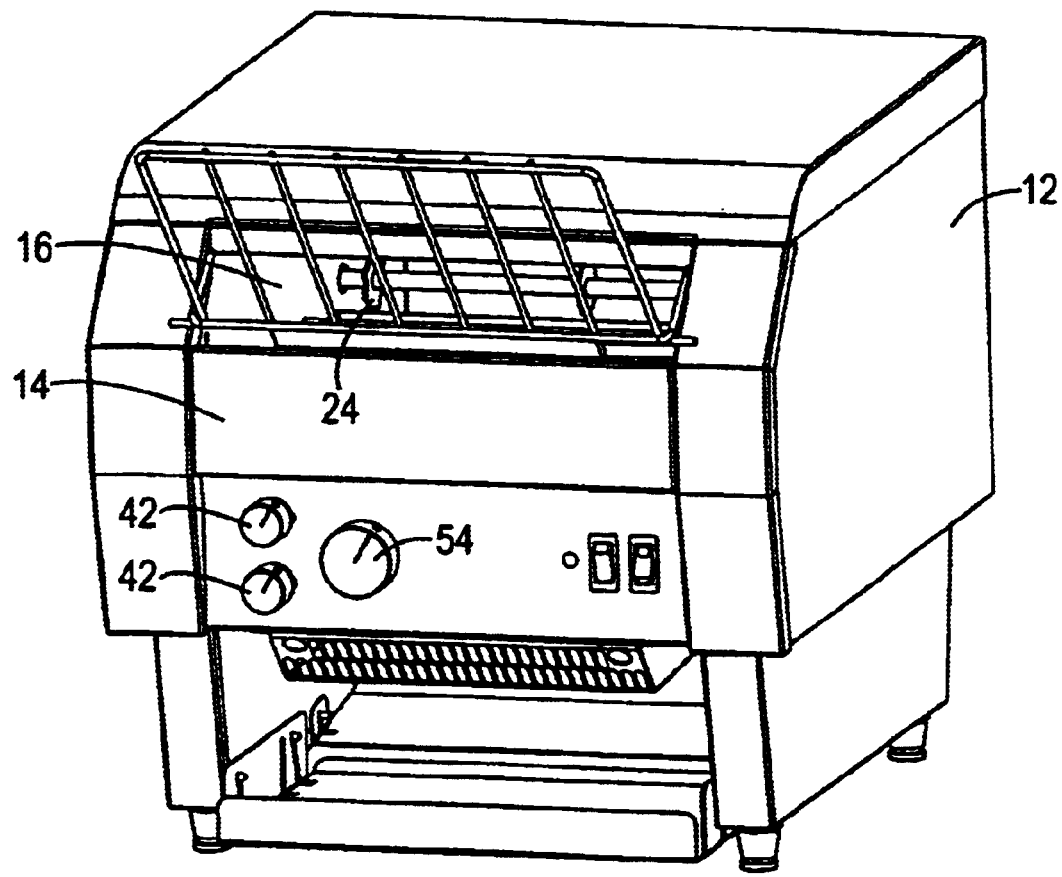
FIG. 5 is a perspective view of another conveyor oven adaptable for use with the control system according to an alternative embodiment.

The conveyor oven described herein is similar to the TK-100 and TK-105E toaster conveyor ovens made by Hatco Corp. of Wisconsin, except for the speed control system described below. These control systems can also be used in other exemplary conveyor ovens having a motor-driven conveyor for carrying food or other products in close proximity to one or more banks of heating elements, such as the TQ-300 shown schematically in FIG. 5, and the TQ-700 series toaster conveyor ovens made by Hatco Corp, or similar ovens made by other suppliers. These control systems can be used in conveyor ovens which heat other types of food (e.g. conveyorized pizza ovens) or to heat non-food products (e.g. ovens for curing rubber or drying ink).

Figure 3:
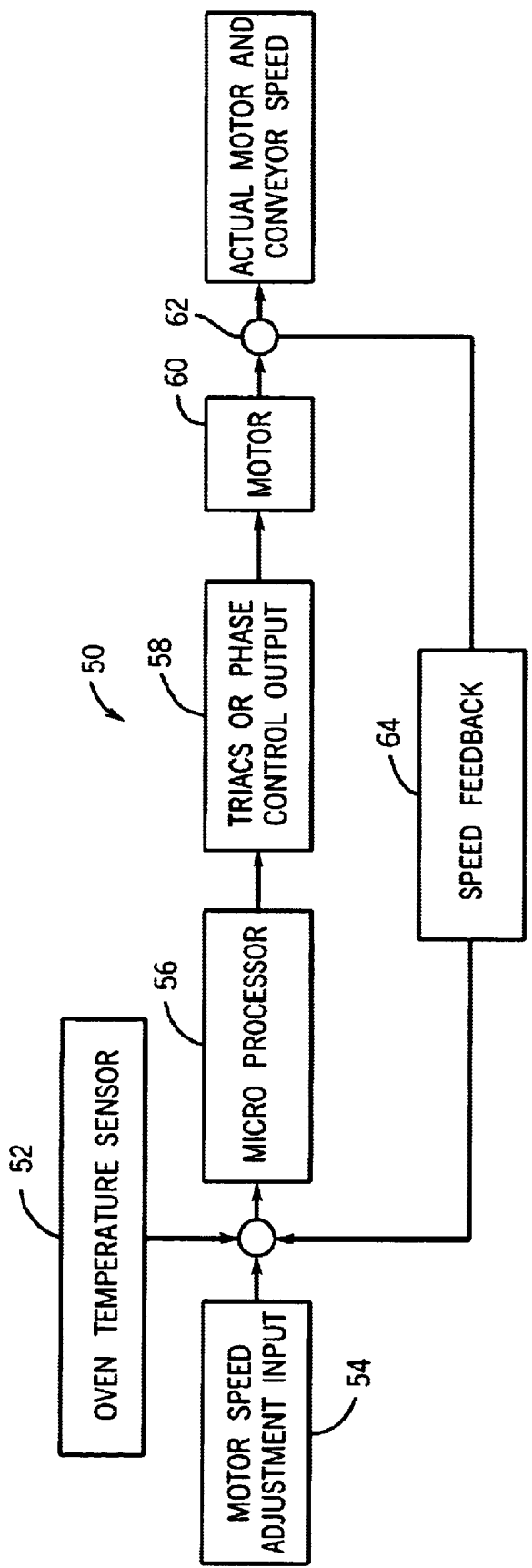
FIG. 3 is a block diagram of a control system for a conveyor oven according to an exemplary embodiment of the present invention.

Referring to FIG. 3, in an existing conveyor oven, the conveyor speed is controlled by a speed control system 50 according to an exemplary embodiment. The speed at which motor 60 drives the conveyor is determined by conveyor speed control system 50. Speed control system 50 includes a temperature sensor 52 (such as a thermocouple, resistance temperature detector, etc.). Temperature sensor 52 is preferably a type K thermocouple, but may be a thermocouple using other bimetallic materials. Alternatively the temperature sensor may be a resistance temperature detector of the 1000 OHM or 100 OHM platinum type having suitable accuracy within a range of ambient temperature to 650 degrees Fahrenheit. Control system 50 also includes speed adjustment input 54 that is preferably a rotary knob interfacing with a potentiometer such that with the knob at one end of its travel range a minimum motor speed signal is provided and with the knob at the other end of its travel range a maximum speed signal is provided. Alternatively, speed adjustment input may be a slide knob interfacing with a rheostat. Motor 60 is provided to drive conveyor, and is preferably an electric, alternating current (AC), shaded, pole-type gear motor. This type of motor is typically intended to operate only at one speed according to the setting provided by speed input adjustment 54, and without feedback, whereby the motor speed may not be linear with a range of speed input adjustment settings. To allow motor 60 to operate at reduced speeds and to provide linear adjustment of speed control, control system 50 includes a motor speed sensor 62 capable of providing a feedback signal 64, such as a tachometer, but preferably a hall effect sensor, to monitor and feedback motor speed information to control system 50 to provide closed-loop, linear speed control when changing the setting of speed adjustment input 54. Linear speed adjustment is preferred so that uniform, incremental changes to speed adjustment input 54 results in correspondingly uniform changes in motor speed. However, in alternative embodiments, a motor speed sensor may be omitted and motor speed changes may be non-linear in relation to speed adjustment input changes and non-linear control technique and/or heuristics may be used.

Microprocessor 56 controls the speed of motor 60 by modulating the AC wave form (of the sine-wave type), using conventional triacs 58, such that each time the AC wave form supplied to motor 60 crosses through zero (0) volts, a zero-cross interrupt is generated. An algorithm programmed in microprocessor 56 compares the microprocessor output signal to the zero-cross interrupt for each wave form cycle and controls the triacs 58 for raising or lowering the supply voltage (and corresponding power) to the motor. The algorithm includes a table of full voltage and reduced voltage cycle patterns. One exemplary pattern would provide four (4) full voltage cycles followed by two (2) reduced voltage cycles which cause motor 60 to run at a certain reduced speed. Other patterns are developed corresponding to other desired reduced motor speeds. In an alternative embodiment, the motor speed may be controlled by methods such as phase control, where a triac is used to completely block voltage supplied to the motor for a portion of each half cycle of the fifty (50) or sixty (60) hertz wave form. The length of the zero (0) voltage portion of the wave form may be controlled by a potentiometer adjustment where the longer the voltage is blocked, the slower the motor will run.

Referring to FIG. 3, microprocessor 56 preferably receives input signals from speed adjustment input 54, temperature sensor 52 and sensor 62 and provides an output signal to control the speed of motor 60. According to other alternative embodiments, the microprocessor may include additional inputs for refining control system operation such as a timer and information relating to the number of heating elements in operation. In normal operation, the amount of heating or toasting of the food product is controlled by manual adjustment of speed adjustment input 54 in a conventional manner. Control system 50 provides a batch compensation mode that may override the motor speed signal provided by speed adjustment input 54 when a decrease in steady state oven temperature is detected by temperature sensor 52. Microprocessor 50 calculates a steady state oven temperature by averaging the normal running oven temperature over a suitable time period, preferably five minutes. Microprocessor 56 includes a memory storage for storing the steady state oven temperatures calculated for a variety of speed adjustment input selections for reference that may be factory-set or may be created and stored during user operation. Microprocessor 56 continually compares the calculated or stored steady state oven temperature corresponding to the selected speed adjustment input to the instantaneous oven temperature. When the instantaneous oven temperature decreases (e.g. by the introduction of a new load of food products to be heated) by a pre-selected number of degrees Fahrenheit or Celsius below the steady state oven temperature, microprocessor 56 interrupts the steady state temperature calculation and changes the output signal to reduce the speed of motor 60 in proportion to the temperature drop. The oven temperature will increase as the temperature of the food product increases from ambient temperature. As the oven temperature approaches the steady state oven temperature the microprocessor will send a correspondingly increasing output signal to increase motor speed until motor speed reaches the existing selected speed setting indicated by speed adjustment input 54, and calculation of steady state oven temperature is resumed. The microprocessor will also respond accordingly to changes made to the speed adjustment input while the microprocessor is operating in the batch compensation made by using the steady state oven temperature stored in memory that most closely corresponds to the selected speed adjustment input. If changes are made to the heater adjustments, the microprocessor may be programmed to discontinue batch compensation mode operation until a new steady state temperature has been calculated.

In a particularly preferred embodiment, the proportional reduction of motor speed to temperature drop provided by microprocessor 56 is user-programmable or factory-programmed so that when the decrease in oven temperature from the steady state oven temperature is within the range of ten (10) to thirty (30) degrees Fahrenheit, the microprocessor provides an output signal to decrease the motor speed corresponding to the selected speed adjustment input setting (i.e. selected speed) by ten (10) percent of the selected speed. When the decrease in oven temperature from the steady state oven temperature is within the range of thirty (30) degrees to fifty (50) degrees Fahrenheit, the microprocessor provides an output signal to decrease the motor speed corresponding to the speed adjustment input setting by thirty (30) percent of the selected speed. When the decrease in oven temperature from the steady state oven temperature is greater than fifty (50) degrees Fahrenheit, the microprocessor provides an output signal to decreases the motor speed corresponding to the speed adjustment input setting by ten (10) percent of the selected speed. In alternative embodiments, the microprocessor may be configured so that the proportional reduction of motor speed to oven temperature decrease may be set according to any suitable speed to temperature relationship for providing a responsive control system providing uniformly heated food products under changing oven temperature conditions.

Microprocessor 56 may also be configured to provide a standby mode of operation to reduce power consumption by the heating elements and conserve energy during time periods when the oven will not be used for heating food products. In the standby mode of operation, the heating elements cycle between an energized condition (i.e. "on") and a de-energized condition (i.e. "off") and an indicator (such as a flashing lamp or LED display) may be provided indication to an operator of the standby mode status. The duration of time during which the heating elements are energized and de-energized may be user-programmable or may be factory-set. Microprocessor 56 may interface with a selector switch, such as a dual in-line packet (DIP) switch or other suitable switch device, for providing both manual and automatic control capability for the standby mode. During the manual standby mode the selector switch bypasses the automatic mode in microprocessor 56 and allows direct operator selection of standby mode entry using a separate switch that operates between a normal mode and the standby mode. During the automatic standby mode, the selector switch bypasses the manual mode and the microprocessor will automatically enter the standby mode when the deviation in steady state oven temperature remains within a preset temperature range for a programmed period of time.

In a particularly preferred embodiment, microprocessor 56 is fabricated on a board made of a fiberglass material and be conformal coated with materials approved by the Underwriters Laboratory. The microprocessor is preferably capable of withstanding operating environment conditions of seventy 70 degrees Celsius and ninety-five percent (95%) relative humidity and is located within an area of the oven housing that is shielded from the heating elements and cooled by the airflow from a conventional oven housing cooling fan. The microprocessor is also preferably immune to permanent damage from voltage spikes transients, but may be provided with an automatic reset function following voltage transients provided that no data loss or perceptible change in operation occurs.

It is important to note that the construction and arrangement of the elements of the oven conveyor speed control system as shown in the preferred and other exemplary embodiments is illustrative only. Although only a few embodiments of the present inventions have been described in detail in this disclosure, those skilled in the art who review this disclosure will readily appreciate that many modifications are possible (e.g., variations in algorithms, temperature ranges, conveyor speeds, microprocessor interfaces, oven sizes and food product loading orientations, dimensions, structures, shapes and proportions of the various elements, values of parameters, mounting arrangements for components within the oven structure, interchangeable relationships, use of materials, processes, orientations, etc.) without materially departing from the novel teachings and advantages of the subject matter recited in the claims. For example, the conveyor speed control system may be used in ovens having a generally vertical or horizontal oriented conveyor. In such generally horizontal conveyor ovens, baskets may be omitted such that food products rest directly on the horizontally travelling conveyor until they reach an end point at which they may be directed into a hopper, chute, basket, or other receiving apparatus. Furthermore, a direct current (DC) motor and corresponding control components may be substituted for the AC motor and control components. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the scope of the present inventions as expressed in the appended claims.

What is claimed is:

1. A method of controlling the speed at which an electric motor drives a food conveyor to move food products through a food conveyor oven, comprising the steps of:

setting an operator-adjustable input to a digital controller that provides a digital output signal to drive the motor at a desired speed for a given load of food products;

sensing a temperature within the food conveyor oven;

converting the temperature to a digital temperature signal;

providing the digital temperature signal to the digital controller;

determining, by the digital controller, when a change in load of food products has occurred based on a change in the sensed temperature; and compensating for the change in load by changing the output signal of the digital controller to the motor, effectively changing the setting of the operator-adjustable input, whereby the speed of the food conveyor is changed to compensate for the change in load.

2. The method of claim 1 further comprising the step of providing a motor speed feedback signal to the digital controller to improve the linearity of the relationship between the operator-adjustable input and the speed of the food conveyor.

3. The method of claim 1 further comprising the step of locating the digital controller within an oven housing portion that provides an air flow cooling supply.

4. The method of claim 1, further comprising the step of switching one or more heating elements into a standby mode to reduce energy consumption of the food conveyor oven.

5. A food conveyor oven, comprising:
   an oven housing;
   a plurality of heating elements mounted within the oven housing;
   a food conveyor configured to move food products through the oven housing adjacent The heating elements, whereby the food products are exposed to The plurality of heating elements;
   an electric motor mechanically coupled to The conveyor to move the food conveyor at different speeds in response to the temperature within the oven housing;
   a speed adjustment input device configured to provide an initial speed setting to the motor;
   a temperature-sensing device configured to generate a temperature signal based upon the temperature within the oven housing; and
   a digital controller coupled to the speed adjustment input device, the motor, and the temperature-sensing device, wherein the digital controller is configured to decrease the speed of the food conveyor when the sensed temperature drops below a steady state oven temperature and increase the speed of the food conveyor when the sensed temperature approaches the steady state oven temperature, in accordance with a control algorithm stored in a memory of the digital controller.

6. The conveyor oven of claim 5, wherein the digital controller calculates a steady state oven temperature by averaging the sensed temperature over a predetermined period of time.

7. The food conveyor oven of claim 6, wherein the digital controller periodically compares en instantaneous temperature sensed by the temperature-sensing device to the steady state oven temperature.

8. The food conveyor oven of claim 7, wherein the digital controller decreases the speed of the food conveyor by approximately ten percent of the initial speed setting when the instantaneous temperature is within the range of ten to thirty degrees Fahrenheit below the steady state oven temperature.

9. The food conveyor oven of claim 7, wherein the digital controller decreases the speed of the food conveyor by approximately thirty percent of the initial speed setting when the instantaneous temperature is within the range of thirty to fifty degrees Fahrenheit below the steady state oven temperature.

10. The food conveyor oven of claim 7, wherein the digital controller decreases the speed of the food conveyor by approximately fifty percent of the initial speed setting when the instantaneous temperature is fifty degrees Fahrenheit or more below the steady state oven temperature.

11. The food conveyor oven of claim 7, wherein the digital controller returns the conveyor speed to the initial speed setting when the temperature sensed by the temperature sensing device is predetermined temperature below the steady state oven temperature.

12. The food conveyor oven of claim 5, wherein the motor is a shaded pole AC gear motor.

13. The food conveyor oven of claim 5, wherein the digital controller operably interfaces with one or more triacs to change the speed of the food conveyor.

14. The food conveyor oven of claim 5, wherein the digital controller includes an algorithm having a plurality of furl voltage and reduced voltage patterns corresponding to certain reduced food conveyor speeds.

15. The food conveyor oven of claim 5, wherein the digital controller changes the food conveyor speed by a phase control operation, where the triacs block a portion of the voltage wave from supplied to the motor.

16. The food conveyor oven of claim 15, wherein the digital controller adjusts the speed of the food conveyor by varying the portion of the voltage wave form that is supplied to the motor.

17. A control system for controlling the speed at which an electric motor drives a food conveyor to move food products through a food conveyor oven, comprising:
   a temperature sensor configured to sense the temperature of the conveyor oven at a food product heating region near the food conveyor;
   a speed adjustment input for selecting a speed setting corresponding to a desired amount of heat to be transferred to the food products that move through the food conveyor oven; and
   a digital controller having a temperature data storage capacity and a programmable logic capability, the digital controller operably configured to receive an input signal from the temperature sensor and an input signal from the speed adjustment input to perform operations on the stored temperature data and the input signals to provide an output signal to control the speed of the motor according to changes in the temperature of the food conveyor oven.

18. The control system of claim 17, wherein the digital controller further includes a switching capability to automatically switch one or more heating elements into a standby mode when the temperature of the food conveyor oven does not deviate from a predetermined temperature range after a predetermined period of time.

19. The control system of claim 17, further comprising a motor speed sensor that provides a speed feedback signal to the digital controller to provide a linear relationship between the speed adjustment input and the output signal.

20. The control system of claim 17, further comprising one or more triacs operably interfacing with the digital controller for manipulating an AC voltage waveform to change the speed of the motor.

* * * * *

UNITED STATES PATENT AND TRADEMARK OFFICE
CERTIFICATE OF CORRECTION

PATENT NO. : 6,624,396 B2  Page 1 of 1
DATED : September 23, 2003
INVENTOR(S) : Allan E. Witt and Mark E. Gilpatric It is certified that error appears in the above-identified patent and that said Letters Patent is hereby corrected as shown below:

Column 9,
Lines 20 22 and 23, replace the word "The" with the word -- the --;
Line 46, replace the word "en" with the word -- an --;

Column 10,
Line 17, replace the word "furl" with the word -- full --.

Signed and Sealed this

Twenty-fifth Day of November, 2003

JAMES E. ROGAN
*Director of the United States Patent and Trademark Office*